United States Patent [19]

Evans et al.

[11] 4,292,671

[45] Sep. 29, 1981

[54] DIGITAL ALTIMETER COMPUTER

[75] Inventors: James D. Evans; Sam L. Pool, both of Houston, Tex.

[73] Assignee: Hydac, Inc., Houston, Tex.

[21] Appl. No.: 61,928

[22] Filed: Jul. 30, 1979

[51] Int. Cl.³ .......................... G06F 15/50; G01L 7/00
[52] U.S. Cl. .................................... 364/433; 364/434; 73/384
[58] Field of Search ............... 364/433, 434, 558, 562; 340/27 AT, 27 R, 27 NA; 73/384, 386, 387, 179

[56] References Cited

U.S. PATENT DOCUMENTS

| | | | |
|---|---|---|---|
| 3,839,626 | 10/1974 | Klem et al. | 364/558 |
| 3,889,104 | 6/1975 | Smith | 364/433 |
| 3,958,459 | 5/1976 | Shimomura | 73/384 |
| 4,086,580 | 4/1978 | Schroeder | 73/384 |
| 4,086,810 | 5/1978 | Ball | 73/179 |
| 4,106,343 | 8/1978 | Cook | 73/387 |
| 4,135,403 | 1/1979 | Skarvada | 364/433 |
| 4,149,148 | 4/1979 | Miller et al. | 340/27 NA |
| 4,163,387 | 8/1979 | Schroeder | 364/433 |

*Primary Examiner*—Charles E. Atkinson
*Assistant Examiner*—Gary Chin
*Attorney, Agent, or Firm*—Pravel Gambrell; Hewitt Kirk

[57] ABSTRACT

A new and improved computing apparatus for determining aircraft altitude has a pressure transducer to sense atmospheric pressure at which the aircraft is located, and from this and a preset local ground level atmospheric pressure reading, actually solve a non-linear altitude-pressure equation. The computed altitude is used in conjunction with a time measurement to determine aircraft vertical rate. The computed altitude also specifies an address in a memory circuit, with the data stored at such address being the grey code which is transmitted to others for air traffic control purposes.

7 Claims, 4 Drawing Figures

DIGITAL ALTIMETER COMPUTER

FIELD OF INVENTION

The present invention relates to determining and displaying the altitude of aircraft.

DESCRIPTION OF PRIOR ART

It is very important in flying aircraft and for air traffic control purposes to determine as accurately as possible the altitude of an aircraft. It is known that the altitude of an aircraft is related to the static atmospheric pressure external of the aircraft. This relation is, however, non-linear. Further the relation between altitude and pressure, as specified by governmental authorities, is defined by two different expressions depending upon the altitude of the aircraft.

For an aircraft under atmospheric pressure $P_h$ and a local ground level atmosphere pressure $P_L$, in millibars, and with the aircraft altitude between -1,000 and 35,332 feet, the altitude A is defined as:

$$A = 145375 \, (1 - (P_h/P_L)^{0.1923})$$

For altitudes between 35,332 and 70,000 feet, however, the altitude is defined as:

$$A = 35,332 + 47,912.4 \, \log_{10}(234/P_h)$$

There have been several approaches to determining the altitude of aircraft. The first approach can be generally categorized as mechanical systems and included the following U.S. Pat. Nos.: 3,902,355 (tuning fork frequency varied by pressure); 3,202,128 (gears convert rotation of altimeter shaft to digital reading); 3,618,058 and 4,086,580 (gears and optic-electrical encoding); 3,953,487 (brush-disc encoder); and 4,086,580 (altimeter drives shaft which rotates disc providing input signals to optical sensing circuit).

However, the mechanical components of these systems were susceptible to vibrations and acceleration forces, friction losses and the like, reducing the accuracy of altitude determination. Further, calibration of these mechanical systems was often a problem.

Another approach has been to approximate the altitude functions set forth in Equations (1) and (2) above using various types of analog and/or digital circuitry, such as in U.S. Pat. Nos. 3,693,405; 3,726,138; 3,729,999; 3,958,108; 3,958,459; 4,047,001, 4,027,143; and 4,135,403 using various types of non-linear function generators. However, the accuracy of these systems was dependent upon the accuracy to which the function generation circuitry could be calibrated, and the effects of temperature and the like on the stability of the generators. Further, the accuracy of the approximation of the non-linear altitude-pressure function depended upon the precision of the operating characteristics of the function generators and associated circuits.

SUMMARY OF INVENTION

Briefly, the present invention is a new and improved special purpose computer for determining the altitude of an aircraft. A pressure transducer senses the atmospheric pressure at which the aircraft is located and forms an output signal indicative of such pressure. A computing circuit computes the altitude, forming digital altitude signals from the output signal from the pressure transducer. The digital altitude signals from the computing circuit also define and correspond with address locations in a memory storage. The address locations in the memory storage contain code signals representing the altitude of the aircraft according to a pressure-altitude relationship. The code signals stored in the memory storage represent the gray code, which are preferably furnished to a transponder for transmission to others for air traffic control and other purposes. Vertical rate of the aircraft is also determined in the computing circuit, and both the altitude and the vertical rate of the aircraft computed in the computing circuit are displayed.

DESCRIPTION OF PREFERRED EMBODIMENT

Figure 1:
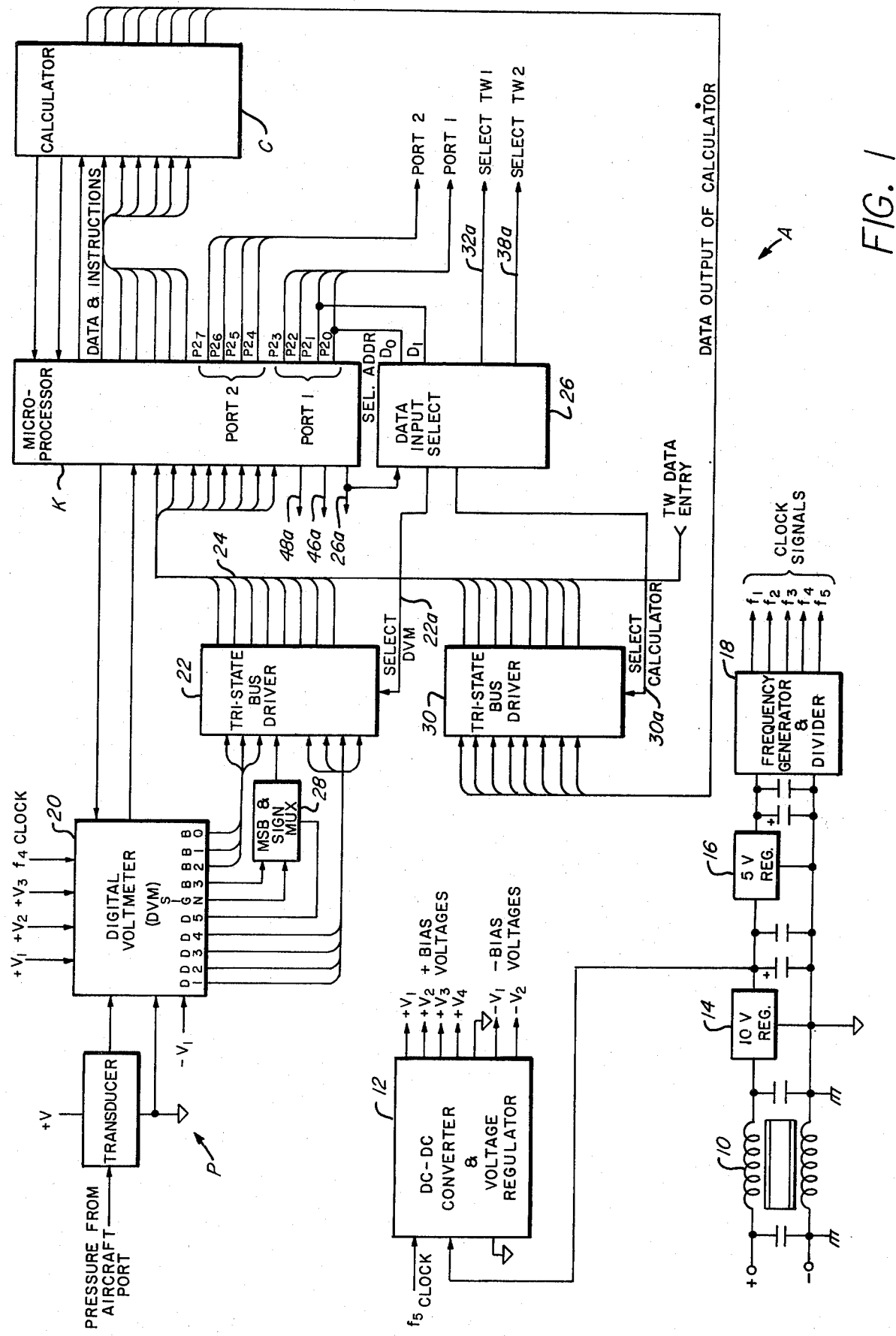
FIGS. 1 and 2 are schematic electrical circuit diagrams of the apparatus of the present invention.
Figure 2:
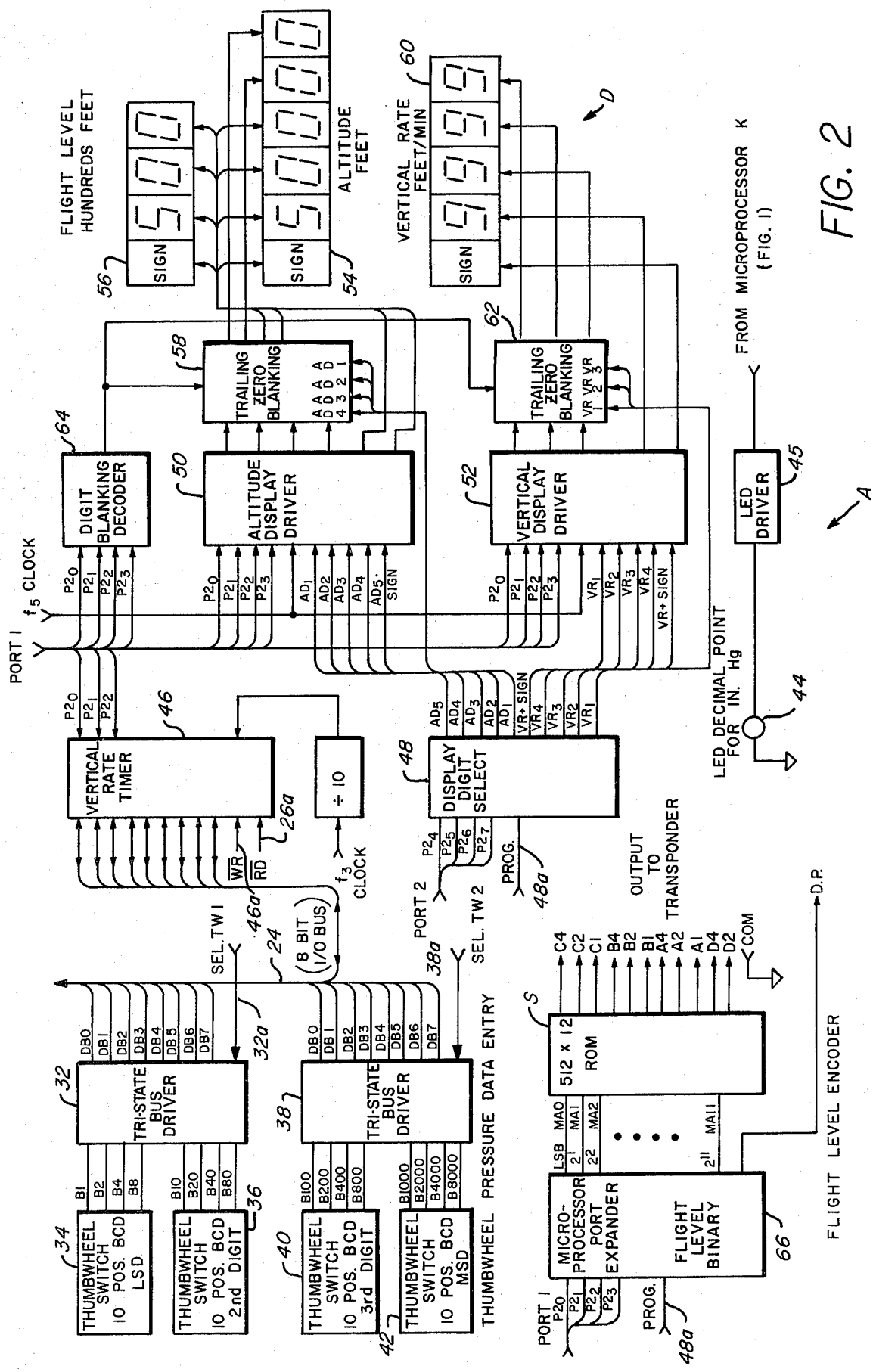

In the drawings, the letter A (FIGS. 1 and 2) designates generally a computer/altimeter according to the present invention for providing an aircraft with an indication of the altitude at which the aircraft is located. The apparatus A also provides an output coded signal indicative of the flight level, which may be sent by a transponder for flight control purposes, and a signal indicative of the vertical rate of the aircraft. The data calculated in the apparatus A are also displayed on board the aircraft by means of a display system D (FIG. 2).

Figure 3:
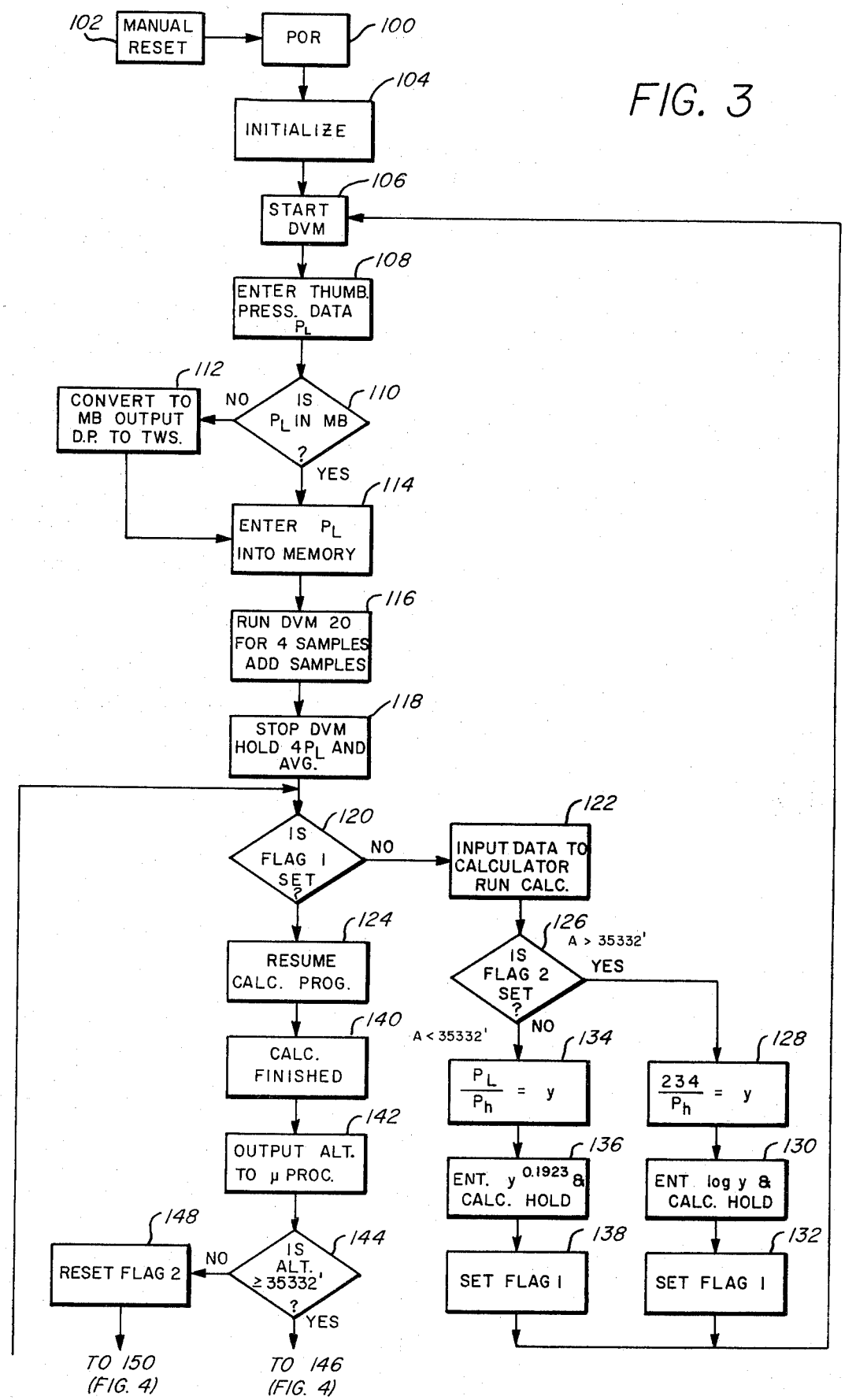
FIGS. 3 and 4 are schematic flow diagrams illustrating the operation of the apparatus of FIGS. 1 and 2.
Figure 4:
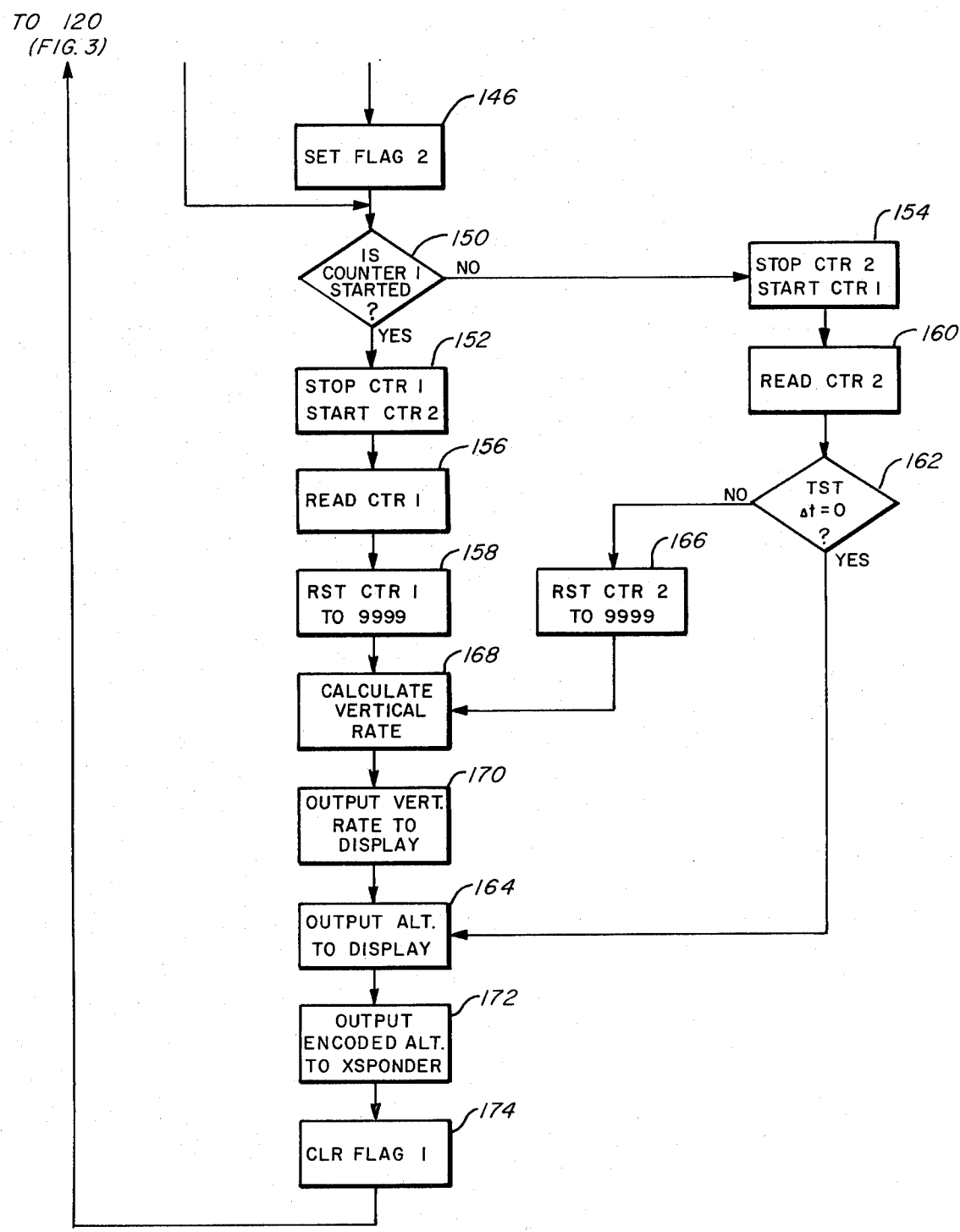

The apparatus A includes a pressure transducer P (FIG. 1) which senses atmospheric pressure at the aircraft's present altitude and forms an output electrical signal indicative of such pressure. A computing or calculating circuit C obtains digital altitude signals from the output of the pressure transducer P which are displayed in the aircraft on the display D. A memory or storage S (FIG. 2) having a plurality of storage locations, each with an address number corresponding to a predetermined one of the digital altitude signals from the computing circuit C, contains coded digital signals therein. The coded digital signals contained at the storage locations of the memory storage S correspond to the grey code for the altitude represented by the digital altitude signal from the computing circuit C. The grey codes from the storage S are provided to a conventional transponder for transmission by radio signal to others for air traffic control and other purposes. A control unit K (FIG. 1), preferably an integrated circuit miroprocessor operating under a predetermined sequence of operating instructions, set forth in FIGS. 3 and 4, controls the operation of the computing apparatus A so that it operates in the manner set forth above.

Considering the apparatus A more in detail, input radio frequency interference filter 10 is electrically connected to the conventional aircraft power supply to receive operating electrical power for the apparatus A, while preventing aircraft electrical bus noise from entering the apparatus A. The filter 10 also prevents noise from a direct current (DC) to direct current (DC) converter and voltage regulator 12 from entering the aircraft electrical system. A voltage regulator or power source 14 of appropriate voltage, with appropriate filtering capacitors at its output, provides power to the converter/voltage regulator 12 and to another voltage regulator 16 of appropriate voltage which provides, through appropriate filtering capacitors at its output, operating power to a frequency generator/divider 18. The frequency generator 18 may be, for example, a six megahertz crystal controlled frequency generator and divider, providing timing control or clock signals of necessary frequencies, as indicated by output conductors, to the remaining circuitry of the apparatus A.

The converter/voltage regulator 12 is preferably a switched DC-DC converter driven by the power source 14 and by a clock signal from frequency generator/divider 18. It is preferable for the converter 12 to be provided with a clock signal whose frequency is an integer sub-multiple of the operating frequency provided by frequency generator 18 to a digital voltmeter 20 connected to the pressure transducer P. The integer sub-multiple frequency is for noise rejection purposes, thereby eliminating power supply interference in readings of the voltmeter 20.

The pressure transducer P senses aircraft static port pressure at a port suitably located on the aircraft and converts that sensed pressure to an output signal whose voltage corresponds to the sensed pressure. The transducer P is preferable internally temperature and voltage controlled to insure accuracy of readings.

The digital voltmeter 20 is a conventional integrated circuit analog to digital converter voltmeter converting input analog voltage to output digital signals and operates under control of the microprocessor K and converts the voltage from the pressure transducer P into an output signal $P_h$ which is a five digit BCD signal, digits $D_5$ through $D_1$, inclusive, composed of four bits, $B_3$ through $B_0$, each. The bits of each of the five digits of the BCD signal $P_h$ are transferred sequentially to the microprocessor K through an input/output circuit 22. The input/output circuit 22 is an eight bit latch which has three states at its output: a high impedance state to prevent loading of the microprocessor K; and "0" or "0" in each bit depending on the data input provided thereto. The input/output circuit 22 receives and stores the digital signals from the voltmeter 20 and makes such signal values available on a data bus 24 in response to a control signal from a data input select circuit 26 in response to the microprocessor K.

In certain areas, the actual altitude of an aircraft in flight may be below sea level and it must be so indicated. Provision is made for this in the apparatus A by means of a gating circuit 28 which replaces the most significant bit $B_3$ of the most significant digit $D_5$ of the BCD signal from voltmeter 20 with a bit representing the sign output from voltmeter 20.

In addition to the pressure signal from input/output circuit 22, the microprocessor K also has three additional digital signals available at selected times on data bus 24: a signal representing the altitude most recently computed by the calculator C, presented over data bus 24 by an input/output circuit 30; a signal from an input/output circuit 32 (FIG. 2) representing the first and second digits of a local area atmospheric pressure at ground level as specified by thumbwheels or other suitable switch inputs 34 and 36; and a signal from an input/output circuit 38 representing the third and fourth digits of the local area atmospheric pressure $P_h$ at ground level as provided by thumbwheels or other suitable inputs 40 and 42. Each of the input/output circuits 30, 40 and 42 are of like structure and operation to the input/output circuit 22. The apparatus A is capable of receiving the local pressure $P_h$ expressed in either inches of mercury or in millibars. A display light 44 located between switches 36 and 40 is energized by a driver 45 when $P_L$ is expressed in inches of mercury.

The data input select circuit 26 is a gating circuit which is activated at predetermined times by a signal over a conductor 26a from the microprocessor K to select an address by decoding a signal of two bits $D_1$ and $D_0$ indicative of which of the four input/output circuits, 20, 30, 32 or 38 is to be instructed to provide the data stored therein to the microprocessor K. Input/output circuit 22 is activated by the selector circuit 26 over a conductor 22a while input/output circuits 30, 32 and 38 are instructed by the selector circuit 26 over conductors 30a, 32a and 38a, respectively.

A vertical rate timer circuit 46, (FIG. 2), which is a programmable interval timer receiving input clock signals from the frequency divider circuit 18, provides a digital output signal over data bus 24 representing a predetermined count interval under control of the microprocessor K over conductors 26a and 46a. In order to provide continuous readings, the vertical rate timer circuit 46 typically includes at least two timer modules, which shall hereinafter be referred to as Counter 1 and Counter 2, respectively, which are alternatively read by the microprocessor K during vertical rate computations.

The microprocessor K receives input data from the data bus 24 from the input/output circuits 20, 30, 32 and 38 and from the vertical rate timer 46 and transfers such data and instructions stored in the microprocessor K, in a manner to be set forth, to the calculator circuit C which determines the altitude and vertical rate of the aircraft. The results of these computations are returned to the microprocessor K for transfer to the display system D.

The microprocessor K may be any suitable commercially available read-only memory microcomputer integrated circuit. The calculator/computing circuit C may be any suitable microprocessor calculator integrated circuit capable of responding to instructions from the control circuit K to calculate the altitude from the known pressure-altitude equations set forth above.

The microprocessor K has at its output two output ports identified in the drawings as PORT 1 and PORT 2. PORT 1 provides four output bits $P2_3$ through $P2_0$ inclusive, from the microprocessor K which represent the value of particular BCD digits in the data values to be displayed in the display system D.

PORT 2 provides four output bits $P2_7$ through $P2_4$, inclusive, which represent the BCD number of either altitude or vertical rate data from the microprocessor K. The contents of PORT 2 output from the microprocessor K are provided to a display digit selecting circuit 48 (FIG. 2). Further, a conductor 48a conveys a digital code from the microprocessor K to a gating circuit 48 indicating whether the PORT 2 signal provided thereto represent codes designating BCD altitude digits $AD_5$ (or-sign) through $AD_1$ of an altitude reading, with the bit data of the PORT 1 output of the microprocessor K indicating the magnitude of such BCD digits or, alternatively, BCD vertical rate digits $VR_4$ through $VR_0$ plus a sign of a vertical rate reading, with the data content of PORT 1 indicates the magnitude of BCD digits of vertical rate data.

The gating circuit 48 transfers altitude data BCD digits $AD_5$ through $AD_4$ to a display driver circuit 50 which is caused to receive for each such BCD digit the value of such digit in altitude data represented by the PORT 1 output signals from the microprocessor K. The vertical rate digits $VR_4$ through $VR_1$ from digital gating circuit 48 are transferred to a display driver circuit 52 which is caused to receive, for each BCD digit the value of such digit in vertical rate data represented at the PORT 1 output from microprocessor K.

The two most significant bits and the sign of the altitude data from the driver circuit 50 are provided to a suitable display 54, such as a liquid crystal display, of adequate capacity to indicate the altitude, both magnitude and sign. The two most significant bits and sign of the altitude data from the driver circuit 50 are also provided to a display 56 to indicate the magnitude and sign of flight level in hundreds of feet. As indicated in the drawings, a suitable number of display modules for display 54 would be five for altitude and one for sign, while three for altitude and one for sign would be needed for flight level. The four least significant digits of the altitude data from display driver 50 are furnished to a trailing zero blanking circuit 58 so that if such data are determined to be absent, in a manner to be set forth, they will not be displayed on the displays 54 and 56.

The most significant digit and sign of the vertical rate data from the vertical rate driver circuit 52 are provided to a suitable display device 60. The three least significant digits of the vertical rate data are provided to a trailing zero blanking circuit 62 so that if such data are determined to be absent they will not be displayed on the display 60.

A digital blanking decoder gating circuit 64 receives the PORT 1 data from the microprocessor K and senses whether the data content of any trailing digits in data to be displayed are absent for the four least significant digits of altitude data and three least significant digits of vertical rate data. If this condition is detected, trailing zero blanking gates 66 and 68 are activated, to block the flow of signal from the drivers 50 and 52 to their respective displays.

The PORT 1 digital signals from the microprocessor K are also provided to an integrated circuit input/output expander circuit 66 (FIG. 2). The expander 66 in response to an output signal on conductor 48a from microprocessor K, indicating that altitude data is being provided by the microprocessor K, converts the four bits of the PORT 1 data from the microprocessor K into a twelve bit digital signal identifying which of a plurality of storage locations in the storage circuit S is to be required to provide as an output signal to a suitable transponder the data content at such storage location. As has previously been set forth, the address numbers of the storage locations correspond to predetermined ones of the digital altitude signals from the computing circuit C and represent the grey code signal for the altitude represented by the digital altitude signal.

OPERATION OF THE MICROPROCESSOR K

A flow chart F sets forth the process steps of the operation of the apparatus A of the present invention in sufficient detail to enable a programmer of ordinary skill in the data processing art to program the microprocessor K with a suitable computer program to operate in accordance with the present invention. The flow chart F sets forth the preferred sequence in which the microprocessor K controls the remaining circuitry of the apparatus A to determine and indicate altitude and vertical rate. An instruction 100 causes the microprocessor K to reset various internal counters to zero and to set internal indicators or flags to a known condition, usually zero, and further to disable the microprocessor K from responding to an interrupt signal during its operating cycle, all of which is done in response to receipt of electrical power by the apparatus A on activation. Alternatively, the reset functions performed during the step 100 may be performed in response to a manual reset signal from a suitable operator control button, as indicated schematically at 102.

Control of the microprocessor K is then transferred to an instruction 104 which initializes certain registers, which will be identified hereinbelow, by loading therein the number of samples of readings to be transferred to the microprocessor K from the digital voltmeter 20 and further a number specifying the number of digits for which altitude values are to be computed, in the preferred embodiment four, and further causing a predetermined count number to be transferred to the two counters of the vertical rate timer circuit 46.

Control of the microprocessor K is next transferred to an instruction 108 which causes the microprocessor K to read in the local ground level air atmospheric pressure $P_L$ from the input/output circuits 32 and 38. A decision instruction 110 then determines whether the input $P_L$ is expressed in millibars of atmospheric pressure or in inches of mercury. If the atmospheric pressure reading from the thumbswitch input/output circuits 32 and 38 is in inches of mercury, control is transferred to an instruction 112 which causes the microprocessor K to convert the pressure into millibars according to the known relationship and control is then transferred to an instruction 114.

In the event that the local pressure input $P_L$ is in millibars, decision instruction 110 transfers control of the microprocessor K directly to the instruction 114. Instruction 114 causes the input pressure $P_L$, expressed in millibars, to be stored in a suitable memory storage location.

An instruction 116 next assumes control of the microprocessor K and causes activation of the digital voltmeter 20, from which a specified number of samples are obtained, based upon the number input during the initializing instruction 104. Each of the samples received from the digital voltmeter by the microprocessor K is then summed and when the predetermined number has been reached, control is transferred to an instruction 118 which stops operation of the digital voltmeter and causes the microprocessor K to hold the value of the summed sample and obtain the average value.

A decision instruction 120 then assumes control of the microprocessor K and checks the status of an indicator or flag, flag 1, in the microprocessor K, the purpose of which is to prevent entry into the calculator C of any new pressure data while the calculator C is operating on previously provided data from the microprocessor K. If flag 1 has not been set, control is transferred to an instruction 122 so that computation may be begun in the calculator C. If flag 1 has been set, indicating that the calculator C is in the process of a calculation cycle, control is transferred to an instruction 124.

When control is transferred by decision instruction 120 to the instruction 122, the microprocessor K is caused to transfer the necessary input data to the calculator C so that the altitude may be determined according to the following pressure-altitude equations:

For altitude A less than 35,332 feet, $$A = 145375(1 - (P_h/P_L)^{0.1923}) \tag{1}$$

For altitudes between 35,332 and 70,000 feet, $$A = 35{,}332 + 47{,}912.4 \log_{10}(234/P_h) \quad (2)$$

In order to determine which of the foregoing relationships is to be applied, a decision instruction 126 assumes control of the microprocessor K and checks the status of a second indicator or flag, flag 2, of the microprocessor K to determine whether from previous calculations the altitude exceeds or is less than 35,332 feet. In the event that the altitude is greater than this number (Flag 2 Set), control is through successive instructions 128, 130 and 132 which cause calculator C under control of the microprocessor K to determine a number y representing the ratio 234//P and then determine $\log_{10} y$. The calculator C then responds to a hold signal from microprocessor K which also sets flag 1 in the microprocessor K and transfers control of the microprocessor K again to instruction 106.

If, however, decision instruction 126 determines that flag 2 has not been set, control is transferred from the decision instruction 126 to an instruction 134 which causes the calculator C to obtain a value y by dividing the value $P_h$ millibars by the value $P_L$ millibars and control is transferred to an instruction 136 which causes the calculator C to determine the amount $y^{0.1923}$. Once this amount has been determined by the calculator C in instruction 136, the calculator C goes into a hold state, and control is transferred to an instruction 138 causing the flag 1 to be set.

Control is then transferred to the instruction 106 and the microprocessor K proceeds through the successive steps to decision instruction 120. Since flag 1 has now been set as a result of either of instruction steps 132 or 138, control is then transferred by decision instruction 120 to the instruction 124 which causes the calculator C with instructions and data from the microprocessor K to calculate the altitude using either of altitude equations (1) or (2) set forth above, depending on the status of flag 2. The calculator C then in accordance with an instruction 140 indicates to the microprocessor K that calculation has been completed and control is transferred to an instruction 142 which causes the microprocessor to receive the calculated altitude value from the calculator C and store such value therein.

Control is then transferred to a decision instruction 144 to determine whether or not the calculated value of altitude exceeds the transition point altitude of 35,332 feet. If this is the case, the indicator flag 2 checked during decision instruction 126 is caused to be set by an instruction 146. If the transition altitude is not met or exceeded, control is transferred to an instruction 148, which causes the indicator flag 2 used in connection with decision instruction 126 to be reset.

A decision instruction 150 now assumes control of the microprocessor K to determine whether or not the first counter or counter 1 in the vertical rate timer circuit 46 is operating. If so, control is transferred to an instruction 152 which causes counter 1 to be stopped, and simultaneously the second counter in the vertical rate time circuit 46, or counter 2 to be started. Conversely, if counter 1 has not been started, control is transferred to an instruction 154 which causes counter 2 to be stopped and counter 1 to be started. When counter 1 is the counter stopped by instruction 152, control is transferred to an instruction 156 which causes the microprocessor K to read the present count value from counter 1 into memory and to then reset counter 1 to a predetermined value in accordance with an instruction 158.

When counter 2 has been operating prior to the time of decision instruction 150, and instruction 160 assumes control of the microproccesor K after performance of the instruction 154. Control is then transferred to a decision instruction 162 which tests to see whether any time has elapsed, as determined by the occurrence of a predetermined decrease in the count of counter 2 since the last previous computation of altitude by the calculator C. If decision instruction 162 determines that no such time has elapsed, indicating that the microprocessor K is going through the steps of flow chart F for the first time, control is tranferred to an instruction 164 which causes the microprocessor K to transfer the value of altitude computed in the calculator C during step 124 to the display circuit D, including the altitude display 54 and the flight level display 56.

Conversely, for subsequent iterations of the apparatus A and subsequent computations of altitude values, decision instruction 162 transfers control to an instruction 166 which resets counter 2 to the predetermined value and then transfers control to an instruction 168 which causes the calculator C to receive $A_t$, the present altitude, and $A_{t-1}$, the previous altitude computations of the calculator C, stored in the memory of the microprocessor K as well as the time elapsed, $\Delta t$, between the computation of such readings which is represented by the reading obtained from counter 1 during step 156 or from counter 2 during step 160. The calculator C then computes the vertical rate of the aircraft in accordance with the following relationship:

$$VR = 342{,}840(A_t - A_{t-1})/\Delta T$$

After performance of step 168, control is transferred to an instruction 170 which causes the microprocessor K to transfer the vertical rate calculated during instruction 168 to the vertical rate display 60 and then transfers control of the microprocessor K to the instruction 164. After the altitude has been transferred to displays 54 and 56 during performance of instruction 164, control is transferred to an instruction 172 which causes the microprocessor K to transfer the altitude calculated by the calculator C to the PORT expander 66 so that the read only memory S may be addressed at the storage location having an address number corresponding to the calculation altitude signal from the calculator C. As has been set forth, the code representing the altitude contained in such storage location is provided to a conventional transponder for transmission to others for air traffic control purposes and the like. After performance of the instruction 172 by the microprocessor K, the indicator flag 1 is cleared in response to an instruction 174 and control is then transferred back to decision instruction 120 so that operations may proceed in the manner set forth above.

The apparatus A according to the present invention offers several advantages over prior art altimeters. First, the encoder/transponder which transmits the altitude readings to others for air traffic control purposes and the like, obtains reading from the pressure transducer P and voltmeter 20, which form the input sensor of the apparatus A so that the pilot of the aircraft sees the same flight level that others are being notified that the aircraft is operating. Further, the apparatus A actually solves the altitude equation rather than requiring a circuit to approximate such function with either a digital function generator or an analog function generator. Further, the apparatus A is an electronic unit, requiring no mechanical gears or encoding wheels which are susceptible to vibration and acceleration forces.

The foregoing disclosure and description of the invention are illustrative and explanatory thereof, and various changes in the size, shape, materials, components, circuit elements, wiring connections and contacts, as well as in the details of the illustrated circuitry and construction may be made without departing from the spirit of the invention.

We claim:

1. An apparatus for determining the altitude of an aircraft, comprising:
    (a) pressure transducer means for sensing the atmospheric pressure at the aircraft's altitude and forming an output signal indicative of such pressure;
    (b) means for forming a digital atmospheric pressure signal from the output signal from the pressure transducer means;
    (c) ground level storing means for storing a local ground level atmospheric pressure signal;
    (d) computing means for forming digital altitude signals representing the aircraft's altitude, said computer means comprising:
        (1) means for storing the digital atmospheric pressure signal;
        (2) means for computing, as a non-linear function of the atmospheric pressure at the elevation of the aircraft and the local ground level atmospheric pressure, digital altitude signals representing the altitude of the aircraft;
        (3) means for storing the computed digital altitude signals;
        (4) control means for controlling the operation of said means for computing; and
        (5) data input select means for causing each of said means for storing to present the signals stored therein to said means for computing on request from said control means; and
    (e) display means for indicating the computed digital altitude signal formed by said computer means.

2. The apparatus of claim 1, further including:
    storage means responsive to said control means of said computer means, said storage means comprising a plurality of storage locations each having an address number corresponding to a predetermined one of the computed digital altitude signals from said computer means, each of said storage locations further containing therein a code representing the altitude of the aircraft; and
    said storage means further comprising means for providing the codes stored therein as output signals to a transponder for transmission by signal to others.

3. The apparatus of claim 1, wherein:
    (a) said computer means further comprises means for forming an average digital atmospheric pressure signal from a plurality of output signals from said means for forming digital atmospheric pressure signals; and
    (b) said means for storing the digital atmospheric pressure signal comprises means for storing the average digital atmospheric pressure signal formed in said computer means.

4. The apparatus of claim 1, wherein said means for computing digital altitude signals comprise means for computing the altitude of the aircraft as a first non-linear function of the atmospheric pressure at the elevation of the aircraft when the computed altitude is below a predetermined altitude and as a second non-linear function of the atmospheric pressure at the elevation of the aircraft when the aircraft is above the first level.

5. The apparatus of claim 1, further including:
    (a) switch means for setting a ground level atmospheric pressure setting; and
    (b) said data select means of said computer means further comprising means for causing said ground level storing means for storing to present the signal stored therein to said means for computing on request therefrom.

6. The apparatus of claim 1, further including:
    (a) vertical rate timer means for forming digital count interval signals;
    (b) said data select means further comprising means causing said vertical rate timer means to present the signals formed therein to said means for computing on request therefrom; and
    (c) said means for computing of said computer means further comprising means for determining the vertical rate of the aircraft.

7. The apparatus of claim 6, further including:
    means for displaying the vertical rate of the aircraft.

* * * * *